(No Model.) 3 Sheets—Sheet.1.
D. W. CURTIS.
APPARATUS FOR TREATING MILK OR CREAM.
No. 549,561. Patented Nov. 12, 1895.

Attest
Cel. Burdine.
C. B. Bull.

David W. Curtis
Inventor,
by Dodge & Sons,
Attys.

(No Model.) 3 Sheets—Sheet 2.
D. W. CURTIS.
APPARATUS FOR TREATING MILK OR CREAM.
No. 549,561. Patented Nov. 12, 1895.
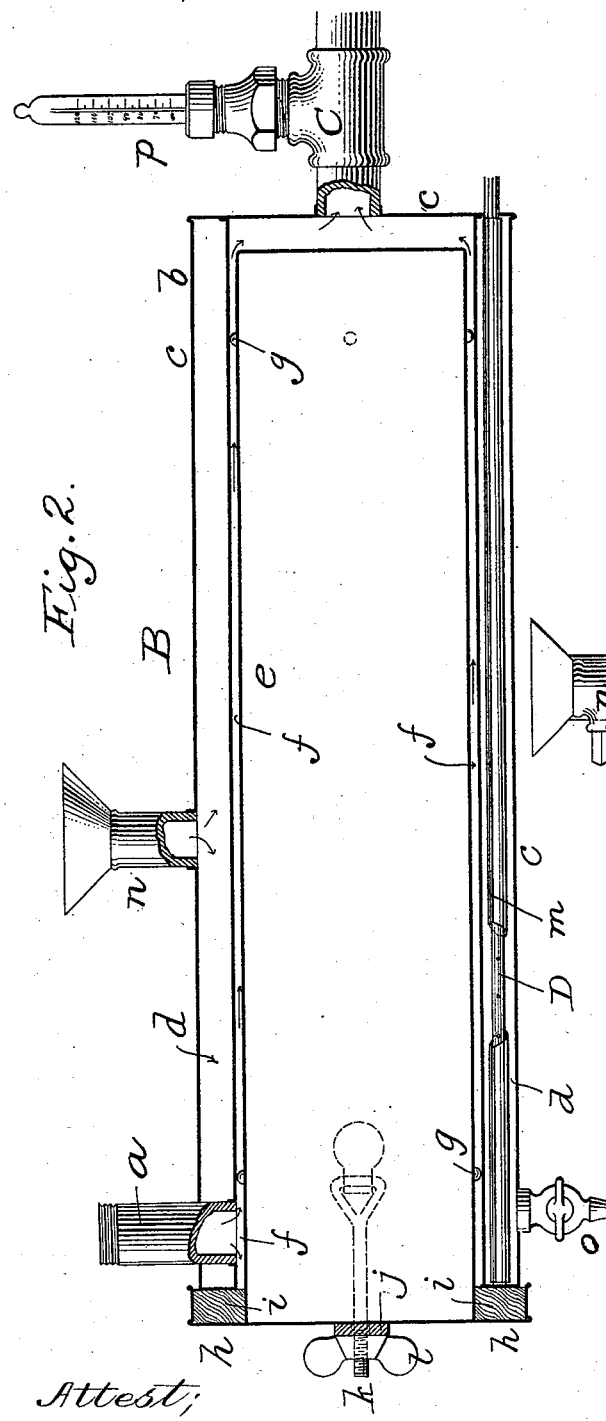
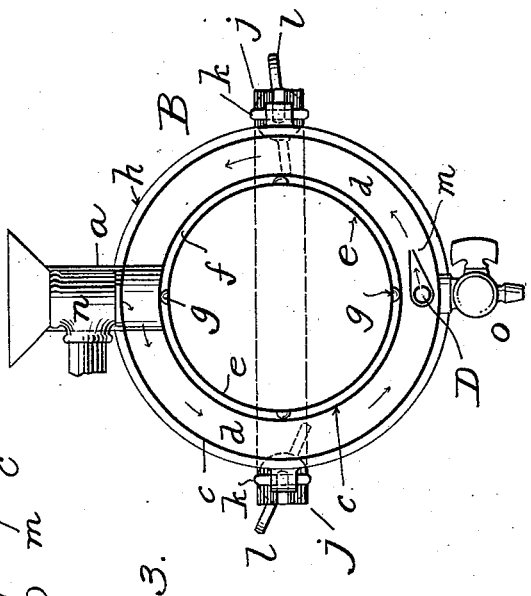
Attest:
L. C. Burdine.
E. B. Bull.
David W. Curtis,
Inventor
by Dodge & Sons,
Att'ys.

(No Model.) 3 Sheets—Sheet 3.

D. W. CURTIS.
APPARATUS FOR TREATING MILK OR CREAM.

No. 549,561. Patented Nov. 12, 1895.

Attest
Co. Burdine.
C. B. Bull.

David W. Curtis
Inventor,
by Dodge Sons,
Attys

ANDREW B.GRAHAM. PHOTO-LITHO. WASHINGTON, D.C.

UNITED STATES PATENT OFFICE.

DAVID W. CURTIS, OF FORT ATKINSON, WISCONSIN.

APPARATUS FOR TREATING MILK OR CREAM.

SPECIFICATION forming part of Letters Patent No. 549,561, dated November 12, 1895.

Application filed July 9, 1895. Serial No. 555,400. (No model.)

*To all whom it may concern:*

Be it known that I, DAVID W. CURTIS, a citizen of the United States, residing at Fort Atkinson, in the county of Jefferson and State of Wisconsin, have invented certain new and useful Improvements in Apparatus for Treating Milk or Cream, of which the following is a specification.

My invention relates to a novel apparatus for treating milk or cream; and it consists in various features, details, and combinations hereinafter set forth and claimed.

Figure 1:
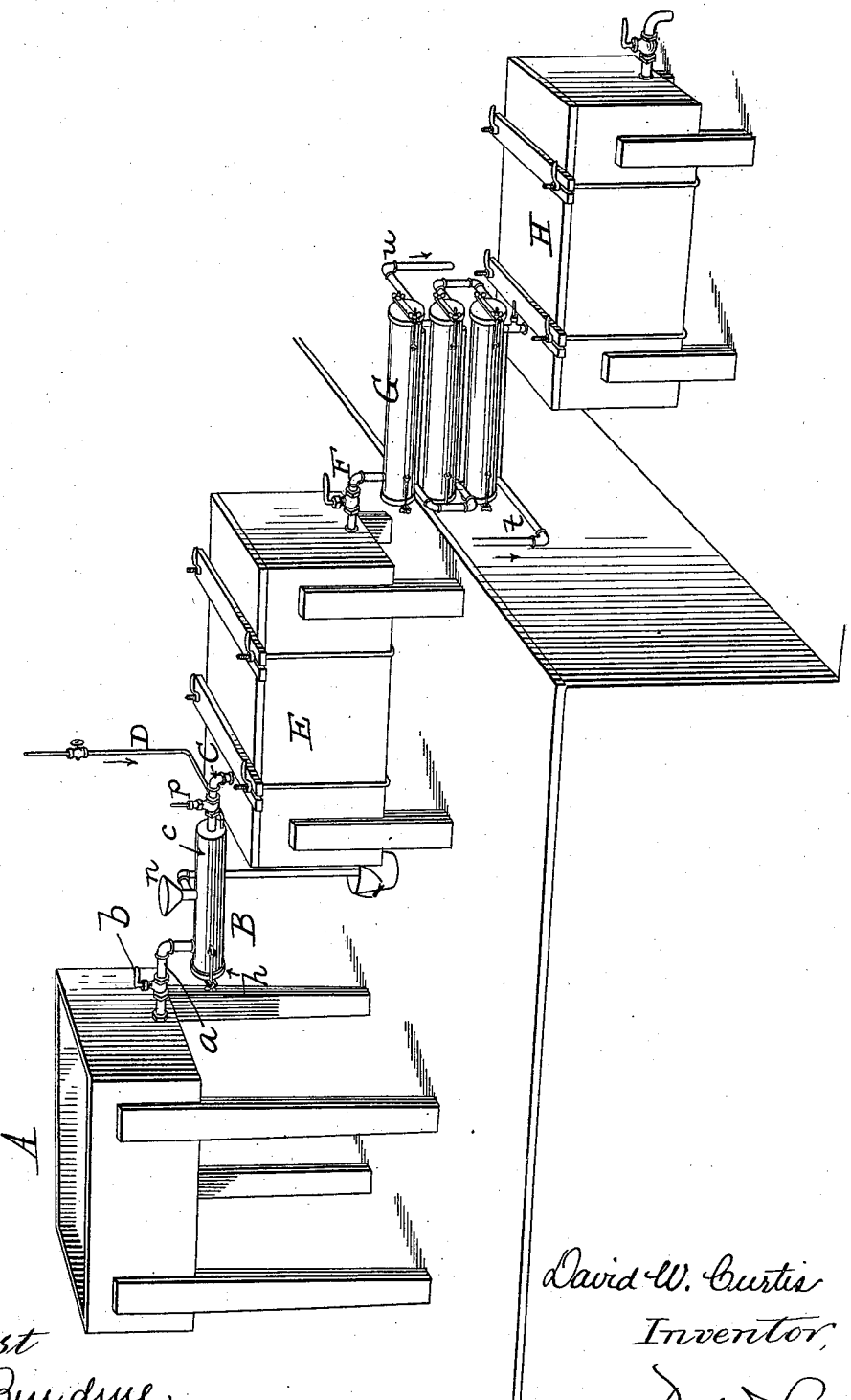
Figure 5:
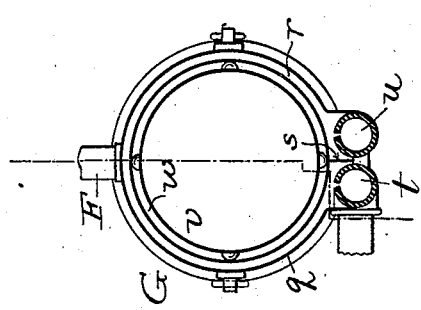
Figure 4:
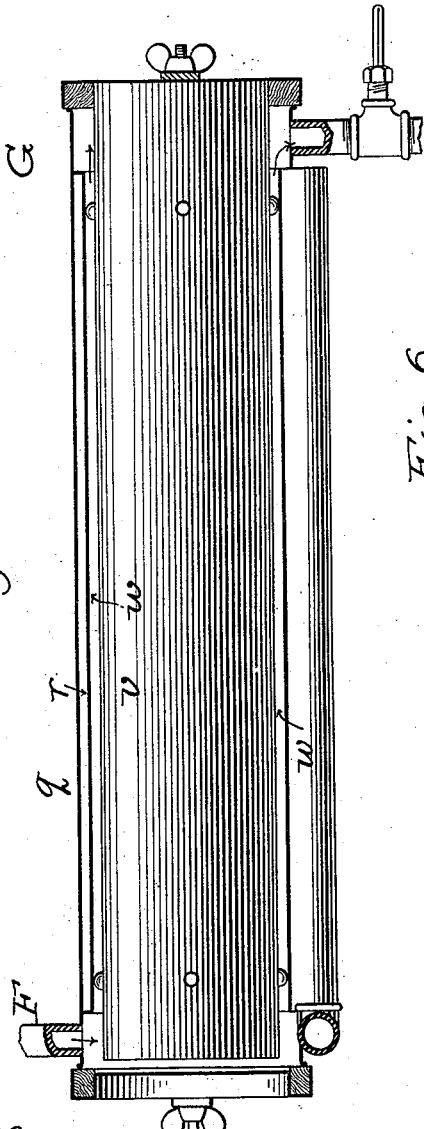
Figure 6:
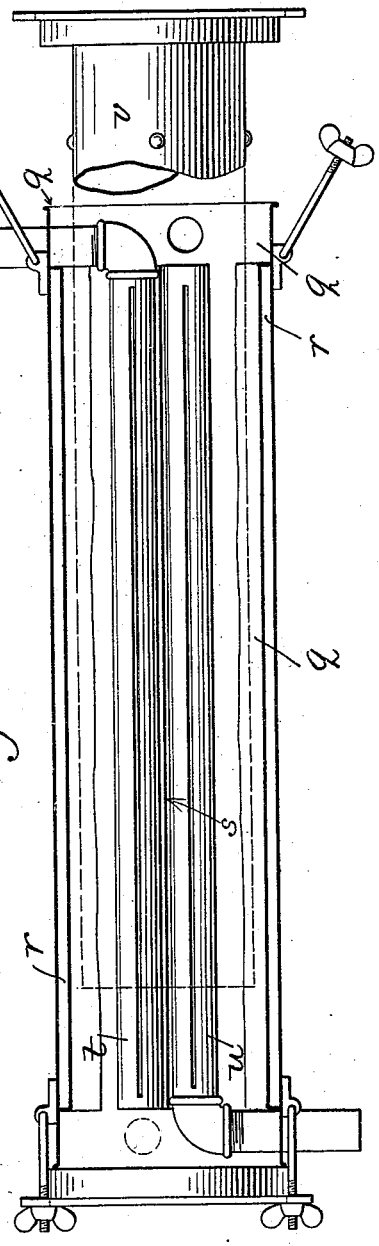

In the drawings, Figure 1 is a perspective view of the apparatus ready for use; Figs. 2 and 3, respectively, longitudinal and transverse sectional views through the heater; and Figs. 4, 5, and 6 similar views of the cooler.

A indicates a supply-tank, vat, or vessel of any desired form, into which the milk or cream is placed, and B indicates a heater connected therewith by means of a pipe $a$, having a valve $b$, as shown in Fig. 1. This heater B (shown in detail in Figs. 2 and 3) comprises two parts—one an open-ended cylinder $c$, provided with an annular space $d$ for the heating medium, and the other a closed cylinder $e$, adapted to fit within the open-ended cylinder. It will be noted upon reference to these figures that the diameter of the removable closed cylinder $e$ is less than the internal diameter of the open-ended cylinder $c$, thereby forming between the two cylinders a narrow or thin channel or passage $f$ for the milk or cream.

Suitable lugs, projections, or other spacing devices $g$, carried by either of the parts $c$ $e$, maintain the parts of the heater in proper relative position. At its outer end the cylinder $e$ is provided with a lateral flange $h$, which has its edge turned up to form a seat for the packing-ring $i$, of cork or other suitable material, the said ring resting against the end of the cylinder $e$ and thereby forming one end wall of the space or passage $f$ for the milk. This enlargement on the head of the removable cylinder also determines the distance the latter cylinder may project into the outer cylinder, it being necessary to prevent the cylinder $e$ from contacting with the closed end of the cylinder $c$, in order that the milk or cream may escape from the space or chamber $f$ into the outlet-pipe C, which extends from the end of the cylinder $c$.

In order to hold the cylinder $e$ in place, I provide the latter with a notched or slotted cross-bar $j$, which is designed to be engaged by the swinging bolts $k$, pivoted to the sides of the heater and provided with thumb-screws $l$.

Any other suitable locking or securing means may be employed so long as they hold the packing-ring against the end of the cylinder $c$ with sufficient force to prevent the escape of the milk or cream.

The pipe $a$ from the tank or vessel A passes through the hollow wall of cylinder $c$ and opens into the interior thereof, or when the cylinder $e$ is in place it may be said to open into the milk space or passage $f$, as shown in Fig. 3.

At the lower side of the heater within the annular space $d$ is placed a pipe D, which is perforated and provided with a discharge-spout $m$, formed by bending a piece of metal around the pipe with its ends close together. It was found in practice that the steam discharging from the perforations into the water made too much noise, but by using this spout with its long narrow discharge-slit, this objection was overcome.

Steam is supplied to the pipe from any convenient source; and to prevent the bursting of the outer cylinder and to provide for the overflow due to condensation the said outer cylinder is provided with a pipe $n$, which serves not only as a vent, but also as a filling-tube. Cylinder $c$ is also provided with a draw-off cock $o$, as shown.

The cylinders may be made of tin or copper, and in practice are about eighteen inches in length, while their diameters are such as to afford a water-space of about three-fourths of an inch and a milk space or passage of about three-sixteenths of an inch.

From the foregoing it will be seen that the milk or cream is delivered to the space, channel, or passage $f$ by pipe $a$, and distributes itself in a thin stratum or layer in said passage between the two cylinders $c$ and $e$.

The passage or space $d$ is filled with water, and on steam being admitted to pipe D the water is heated by the steam and compelled to circulate continuously around the thin layer of milk, thereby heating the latter thoroughly, evenly, and rapidly to the desired temperature. Where milk or cream is delivered in a solid stream, as from a pipe, or is placed in bulk in a vessel, it cannot be thoroughly and evenly heated. Hence the present construction, which insures a rapid and equable heating of the milk, is of the utmost importance, especially when it is employed for sterilizing or pasteurizing, or, indeed, for any other process of treating milk or cream.

By making the inner cylinder removable, the milk or cream chamber or passage can be readily and thoroughly cleansed, the removal of the cylinder $e$, which forms one wall of the said passage, permitting ready access to the interior of the cylinder $c$, forming the other wall.

The outlet-pipe C for the heated milk or cream is provided with a thermometer $p$, and connects with a storage tank or receptacle E, which is preferably of the construction shown in Letters Patent No. 329,626, granted to me November 3, 1885, the milk after being heated being allowed to stand in said tank or vessel E for a period of about twenty minutes. It has been found in practice that the heated milk when delivered into one of these tanks or vessels retains its heat so as to effectually kill the bacteria. After the milk has remained in this tank a sufficient length of time, it is delivered by a valved pipe F to the coolers G, the number of coolers employed being varied as circumstances may require.

Cooler G (shown in detail in Figs. 4, 5, and 6) comprises a cylinder $q$, having a hollow wall forming a water space or passage $r$, which latter is divided by a longitudinal diaphragm or partition $s$ at its lower side and provided on opposite sides of the partition with two slotted pipes $t$ and $u$. This cylinder $q$ is open at one end and may also be provided with a removable head at the opposite end, if desired.

Within the cylinder $q$ is a removable cylinder $v$, which sets away from the interior of the cylinder $q$ to form a space, channel, or passage $w$ for the milk between the inner and outer cylinders, substantially as in the heater. The pipe F delivers the milk into the passage or channel $w$ thus formed, and the milk spreads itself out into a thin layer or stratum, so as to be evenly, thoroughly, and rapidly cooled by the water circulating in the surrounding passage $q'$, the circulation of the water being insured by the pipes $t$ and $u$, one of which is the inlet and the other the outlet for the cooling water.

The removability of the internal cylinder $v$ permits the ready and thorough cleansing of all surfaces with which the milk comes in contact.

The milk after having been cooled is delivered to a tank H, similar to the tank E, from which it may be drawn for bottling.

In some cases the tank E may be dispensed with and the cooler connected directly with the heater or the heater may be used alone— as, for instance, when the milk is to be passed to a separator for separating the cream from the milk, as is done in creameries.

The vessels $e$ and $v$ are practically hermetically closed—that is to say, they are closed against the admission of air or any heating or cooling medium. If these vessels were left open, the very cold air of winter would chill the surface and interfere with the heating of the milk. So, too, in hot weather the effect of the cooling medium would be materially lessened if hot air could enter into these vessels.

In cooling, ice-water will be used, and the water as it flows from the cooler may be pumped back into the tank from which it is supplied, and thus be used over and over, the tank being kept supplied with ice to give to the water the proper temperature.

In using the term "jacketed vessel" I do not mean to be understood as including that class of devices in which there are merely two or more concentric open vessels to contain a heating or a cooling medium, and applied, respectively, to the inner and outer sides of the body of milk. Such devices as I have just referred to as not being within the scope of my invention are of doubtful value when used by the individual farmer, and are found to be of no value whatever in the factory or dairy. In order to effect the rapid and thorough heating or cooling of the milk two things are essential, the milk must be distributed in a thin sheet or layer and the heating or cooling medium must be caused to circulate, as otherwise there will not be that even distribution of heat or cold to the milk as is essential to the destruction of the germs.

It is particularly desirable that there be as few joints or seams as possible in the milk-passage to avoid the lodgement of bacteria, which will live even in very hot water.

Having thus described my invention, what I claim is—

1. In combination with a jacketed vessel provided with pipes for insuring a circulation of the heating or cooling medium in the jacket, and closed at one end and open at the other; a removable hollow shell of slightly less diameter than the vessel and adapted to be readily inserted into and removed from the same; a packing ring carried by the shell and closing one end of the milk passage; and means for holding the shell in place.

2. In combination with the jacketed vessel $c$ closed at one end and open at the other; a closed vessel $e$ of a length and diameter less than that of the jacket, and having a packing ring $i$ to close and form one end of the narrow milk passage or channel $f$ between the vessels $e$ and $c$; means for supplying a heating or cooling medium to the space $d$ of the jacket; a pipe to admit milk to the passage $f$; and a milk outlet.

3. In a heater having a water jacket and a passage for the milk or cream; the perforated steam supply pipe provided with the slotted discharge spout.

4. In combination with the jacketed vessel closed at one end; the closed shell fitting within the vessel; a packing ring carried by the closed vessel and fitting against the open end of the jacketed vessel; and means for holding the shell in place.

5. In combination with the jacketed vessel $q$, having a diaphragm $s$ to divide the water space of said jacket; inlet and outlet pipes $t$ and $u$ located in said space on opposite sides of the diaphragm; a closed vessel $v$ fitting within the jacketed vessel $q$ but set away from the sides of the latter to afford a thin or narrow milk channel $w$; and milk inlet and outlet pipes.

In witness whereof I hereunto set my hand in the presence of two witnesses.

DAVID W. CURTIS.

Witnesses:
L. GOSSELIN,
H. H. CURTIS.